Figures 1, 2:
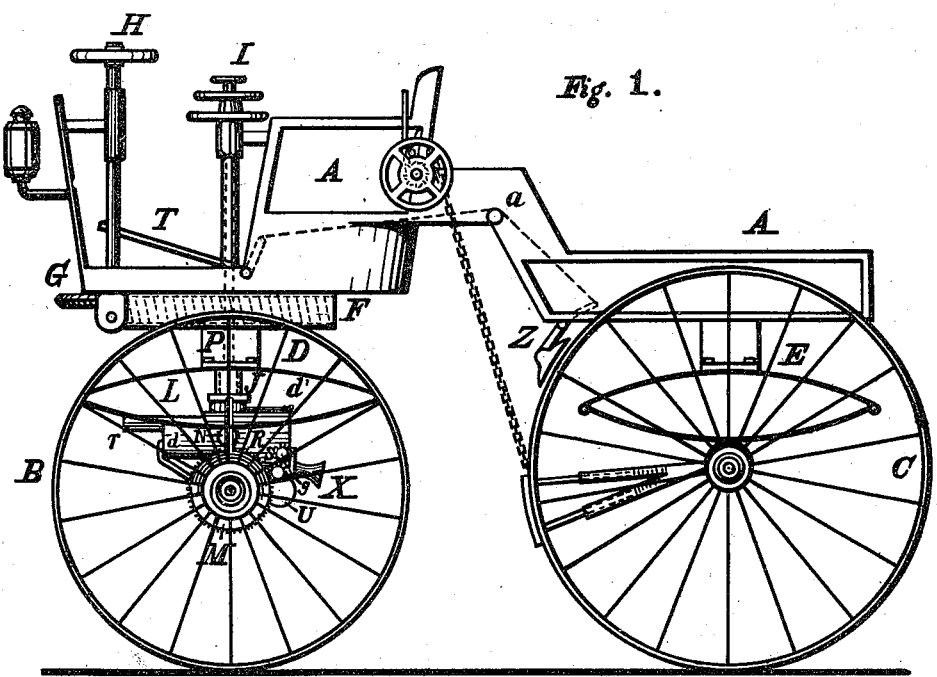

G. B. SELDEN.
ROAD ENGINE.
APPLICATION FILED SEPT. 7, 1895.

1,028,501.

Patented June 4, 1912.

2 SHEETS—SHEET 1.

WITNESSES:
James H. Cooper.
H. H. Cooper.

INVENTOR:
Geo. B. Selden.

G. B. SELDEN.
ROAD ENGINE.
APPLICATION FILED SEPT. 7, 1895.
1,028,501.
Patented June 4, 1912.
2 SHEETS—SHEET 2.
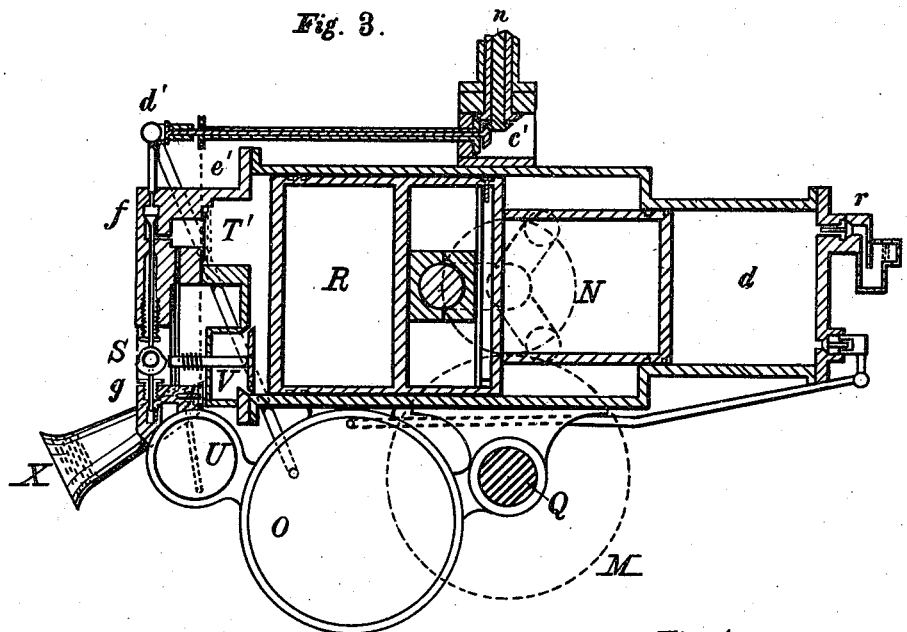
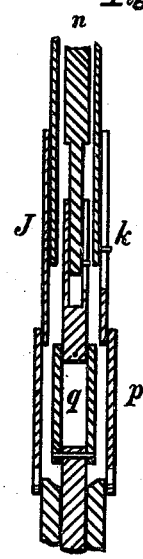
WITNESSES:
James H. Cooper.
H. C. H. Cooper.
INVENTOR:
Geo. B. Selden.

UNITED STATES PATENT OFFICE.

GEORGE B. SELDEN, OF ROCHESTER, NEW YORK.

ROAD-ENGINE.

1,028,501. Specification of Letters Patent. Patented June 4, 1912.

Original application filed May 8, 1879. Divided and this application filed September 7, 1895. Serial No. 561,733.

*To all whom it may concern:*

Be it known that I, GEORGE B. SELDEN, a citizen of the United States, residing in Rochester, in the county of Monroe and State of New York, have invented certain new and useful Improvements in Road-Engines, of which the following is a specification, reference being had to the accompanying drawings, forming a part hereof.

This application is a division of my former application for Letters Patent, filed May 8th, 1879, upon which Letters Patent of the United States, No. 549,160 were granted to me November 5th, 1895.

The general object of this invention is the same as that stated in the specification of the Letters Patent above mentioned, namely, the production of a safe, simple, and practical, and comparatively cheap road locomotive, light in weight, easy to control, and possessed of sufficient power to overcome any ordinary inclination in the road bed.

More particularly it is the object of this invention to produce a driving and steering truck, embodying the motor in itself, and provided with suitable connections whereby the motor may be controlled, and the steering mechanism may be manipulated from the body of the vehicle, the parts being so arranged and operated in connection with a running gear, that the full carrying capacity of the body of the vehicle can be utilized for the transport of persons or goods; and a further object is to provide a driving and steering truck which can be readily attached to or detached from the body of any road vehicle.

The invention consists in the matters hereinafter described and referred to in the appended claims.

A convenient and practical embodiment of the invention is shown in the accompanying drawings, in which—

Figure 1 is a side elevation of a self-propelling carriage or road vehicle, to which my invention is applied; Fig. 2 is a front elevation of the same; Fig. 3 is a vertical section on an enlarged scale, through the hydrocarbon engine shown in Fig. 1, as applied to the carriage as a source of motive power; Fig. 4 is a vertical section also on an enlarged scale, through the flexible connections for controlling the motor shown in Figs. 1, 2, and 3; Fig. 5 is a detail view of a portion of the devices for controlling the clutches.

It will be understood that while I have shown the motor as supported by and forming a part of the forward truck of the vehicle, and I prefer this construction, because I believe it to be more practical, I do not limit myself to this arrangement, an arrangement by which the motor is supported by and forms a part of the rear truck, being within my invention. That is, I consider my invention as broadly including a truck embodying the features referred to in the claims, whether this truck be a rear truck, or a fore-carriage, or a driving, or a driving and steering truck.

Referring generally to the construction which, for purposes of explanation of the nature of the invention, is illustrated in the drawings, the body A of the vehicle or carriage, which obviously may be of any desired form, is represented as supported upon a front driving and steering truck, having steering and driving wheels B, and a rear carrying or trailing truck, having carrying or trailing wheels C, through the medium of springs D and E respectively. The springs D are detachably secured to and surmounted by a frame P, which in turn is detachably secured to the worm gear F which constitutes the fifth wheel and upon which the body A rests, the whole of the front of the driving and steering truck turning with the worm gear F and with relation to the body A.

The motor in the construction shown, is directly supported by and forms a part of the driving and steering truck, being detachable with the truck when the same is separated from the body, and being controlled by suitable connections which are manipulated from the body of the vehicle, and permit the necessary relative movement between the body and the truck. As herein shown, the motor is preferably a liquid hydrocarbon engine of the compression type, provided with a pinion N meshing into a gear M, by which power is transmitted to the driving wheels B, preferably through a driving axle. A reservoir O for compressed air is shown as connected by suitable pipe connections with an air pump *d* operated by, and forming a part of the engine L, the compressed air being delivered to the combustion chamber T' and working cylinder R and the piston therein of the engine through a valve f, operated by a suitable cam on the shaft S along with a given quantity of liquid hydrocarbon, which is injected by a pump g from the tank U into the combustion chamber T', the products of combustion after the expansion being exhausted through a valve V, opened by the proper cam on shaft S, and passing out through an exhaust pipe X. The cam shaft S may be driven by the gear N, through suitable intermediate gears or other connections, all the gears being boxed in to exclude dust.
As already indicated, the motor is shown as wholly supported by and forms a part of the driving and steering truck, and as represented in the drawing, the springs D may be secured directly to the compressed air reservoir O and the working cylinder or cylinders may also be secured to said reservoir, the reservoir and the cylinders being suitably secured to, and supported upon, the axle Q. The motor may be of any desired type, however, for utilizing any preferred power medium.

The successive charges of air and vaporized hydrocarbon are ignited in the combustion chamber T' by means of a constantly-burning flame therein, although any desired and suitable means of ignition could be employed in this chamber.

Fig. 3 is a central vertical section of the working cylinder and air pump, and in which for convenience of illustration, the combustion-chamber, air-valve, pump, and exhaust-valve are represented in the same plane. It will be understood that in the three-cylindered engine shown each working cylinder is provided with suitable admission valves and combustion apparatus, and that the cranks are preferably arranged at equal angles with each other. It will also be noted by referring to said Fig. 3, that the combustion-chamber T' is fully opened into the working cylinder, that is, that the full charge exerts pressure against the piston. Furthermore, said figure illustrates the opening into the combustion-chamber as controlled by a check-valve shown in heavy black lines with a gauze flame intercepter interposed between the check-valve and the combustion-chamber, as represented by the dotted line.

As represented in the drawings, the wheels B of my driving and steering truck may be mounted upon an axle Q, which is arranged to swivel about a vertical pivot, said axle carrying the motor and wheels B with it as it swivels about said pivot. As also represented in said drawings the movements of the truck, for the purpose of steering the vehicle, may be effected by a worm S', which meshes with the worm gear or fifth wheel F, above referred to, and is mounted on a shaft supported on the body of the vehicle or carriage. The worm may be rotated from the steering wheel H by suitable gearing, such as the gear G and pinion t.

As stated above, power may be transmitted from the motor to the driving wheels B, through the gearing M, N. In the embodiment of a hydrocarbon engine as herein shown, a clutch Y is interposed between the engine and such gearing, to allow the engine to be disconnected, and in case the clutch is employed at this point the cam shaft S should be driven positively from the engine shaft. The driving wheels B may also be connected with the rotating axle or shaft, by which they are driven, through clutches j, j', one member of each being splined on the driving shaft and held in mesh with the other member by a spring or equivalent device, in order to permit independent, that is, varying, rotation of the wheels to facilitate progress over rough roads, and particularly the turning of corners. The clutches j, j', may also be used for the purpose of disconnecting the engine from the traction or driving wheels, the clutches being opened or closed by rods i, i', which are operated by means of spiral slots, with which the ends of said rods engage, in a rotating plate m, which is controlled as hereinafter described. Any suitable form of clutches may be employed.

In order that the clutches and the controlling valves or other controlling devices of the motor or other driving means, may be operated from the body of the vehicle or carriage, without interference by or with the relative movements of the driving and steering truck and the body, it is necessary that some sort of flexible connections be provided between the hand wheels or other controlling means on the body of the vehicle, and the clutches and valves or other motor-controlling devices on the driving and steering truck. As shown in Figs. 1, 2, and 4, such flexible connections may comprise tubes arranged one within the other, as shown at J in Fig. 4, as many as may be necessary and supported by suitable bearings on the body. The inner connection may be a rod n, as shown in Fig. 4. Provision is made for the vertical oscillation of the body with reference to the driving axle and motor by having each rod or tube composed of two parts, capable of sliding on each other, but compelled to rotate together by a spline or pin k in the one engaging a slot in the other. At their lower ends, the connections may pass into a suitable journal on the motor. Above such journal, each connection is provided with a universal joint p, q, Fig. 4, which admits of the oscillation of the driving shaft with reference to the body, the sections of the universal couplings being long enough to admit of this motion in any direction. Each of the universal couplings is made enough larger than the one it incloses to allow the rotation of the one without turning the other. The pins or lugs by which the couplings are connected together should enter slotted holes to permit of freedom of motion. Flexible shafts made of spiral wire coils in suitable coverings or other equivalent devices may be used instead of the universal connections herein described. The valves of the engine or other motor-controlling devices may be connected with the lower ends of the flexible connections, so as to be operated therefrom, in any convenient manner.

As shown in Fig. 3, the air inlet valve $d'$ is controlled from the upper hand wheel I, by the innermost flexible connection, communicating at its lower end by gears $c'$ with an extension rod splined to the valve stem. The inlet supply valves between the tank U and the pump $g$ are controlled by the flexible connections and the cord $e'$. The flexible connections are located in the center of the worm gear or fifth wheel F, so as to allow of the free action of the steering apparatus. It will also be understood that the plate $m$ is also rotated from one of the hand wheels I through one of the flexible connections J.

The brake is shown at Z operated by a rope running over a corner pulley $a$ and controlled by the brake pedal T.

The letter $r$ represents an air inlet valve.

My improved driving and steering truck may be conveniently employed with any form of trackless vehicle, being complete in itself, and readily applied to, or detached from the vehicle or vehicle body with which it is used. Thus, in the arrangement shown, the hand wheels I may be removed and the body of the vehicle lifted from its support upon the worm gear or fifth wheel F; or the separation between the truck and the body may be effected between the springs D and the frame P, or in any other desired manner.

I do not wish to be limited to the precise details of construction and arrangement herein shown, and described, as modifications and changes may be made without departing from the spirit of my invention.

Having thus described my invention, what I claim as new, and desire to secure by Letters Patent, is:

1. The combination with the body of a road engine or self-propelling vehicle, of a driving and steering truck therefor, said driving and steering truck comprising an axle, driving and steering wheels and a motor, motor controlling devices, and part of the steering mechanism, said motor controlling devices and a part of the steering mechanism extending within reach of the operator on the body of the vehicle, and means for turning said axle on the axis of the steering mechanism; substantially as described.

2. The combination with the body of a road engine or self-propelling vehicle, of a driving and steering truck, comprising an axle, driving and steering wheels, and a motor, motor controlling devices and a part of the steering mechanism extending within reach of the operator on the body of the vehicle, and means for turning said axle on the axis of the motor controlling devices, whereby the controlling devices remain operative in any position of the truck, with respect to the body; substantially as described.

3. The combination with the body of a road engine or self-propelling vehicle, and a driving and steering fore-truck therefor supporting the body, of driving and steering wheels for said fore truck, a driving mechanism carried thereon, controlling devices therefor and steering mechanism, said steering mechanism including means for turning the axle substantially on the axis of the said controlling devices, whereby the controlling devices remain operative in any position of the truck, with respect to the body; substantially as described.

4. A driving and steering truck for road engines or self-propelling vehicles, comprising an axle, driving and steering wheels, a motor, motor-controlling devices, and a steering mechanism, including means for turning the axle on a substantially vertical axis, and connections between the motor controlling devices and the motor, so constructed as to permit complete rotation of the driving and steering truck; substantially as described.

5. The combination with a driving and steering truck for road engines or self-propelling vehicles, comprising an axle and driving and steering wheels, a motor below the body of the vehicle, flexible motor-controlling devices, and manually operated devices for actuating the motor-controlling devices from above the body of the vehicle; of a steering mechanism including means for turning the axle on the vertical axis of the steering mechanism, said means including a device extending within reach of the operator and permitting complete rotation of the driving and steering truck; substantially as described.

6. The combination with a driving and steering truck for road engines and self-propelling road vehicles, comprising an axle, driving and steering wheels, a motor and motor-controlling devices, and a steering mechanism, an element of which is supported by the axle, of hand-operated devices for actuating the motor-controlling devices from above the body of the vehicle, and flexible connections between said hand-operated devices and the motor-controlling devices, whereby the motor is controlled without interference with or by the relative movement of the truck and body; substantially as described.

7. The combination with the body of a road engine or self-propelling vehicle, of a truck supporting one end of the vehicle body and pivotally connected thereto, whereby it may be used for steering, a motor carried by the truck below and independent of the vehicle body, leaving the body of the vehicle substantially free for the carrying of persons and goods, and means for controlling the motor and for steering the truck, which means extend above the bottom of the body into position to be within reach of a person seated in the vehicle body; substantially as described.

8. A driving and steering truck for road engines and self-propelling vehicles, comprising an axle, driving and steering wheels, a motor carried below the body of said vehicle, clutch connections between the motor and said wheels, clutch-controlling devices, and a steering mechanism associated with said clutch-controlling devices, an element of which steering mechanism is supported by the axle; substantially as described.

9. The combination with a driving and steering truck for road engines or self-propelling road vehicles, of a body supported thereby, an axle on the truck arranged to swivel about a vertical pivot, a hydrocarbon engine of the compression type self-contained on said truck, controlling devices for said engine, and a steering mechanism including an element which is supported by said axle; substantially as described.

10. In a self-propelling road vehicle, the combination with a motor source of power and transmission mechanism, of driving wheels supporting said motor exterior to the body of said vehicle, and means for detachably securing said wheels and motor to the body of the carriage; substantially as described.

11. A driving and steering truck for road engines or self-propelling vehicles, comprising an axle, driving and steering wheels, and a motor, motor-controlling devices, a steering mechanism associated with said motor-controlling devices for turning said axle on an axis substantially coincident with the axis of said steering mechanism, said motor being carried by the driving and steering truck, and intermediate supporting connections between said motor and the body of the vehicle including springs; substantially as described.

12. In a self-propelling road vehicle, the combination with a motor source of energy and transmission mechanism, of driving wheels supporting the motor and vertically yielding devices in the connections between the motor and the body of the vehicle, with means for detachably securing the motor and the wheels to the body of the carriage; substantially as described.

13. The combination of the body of a road engine or self-propelling vehicle, a truck supporting one end of the vehicle body, a second truck supporting the other end of the vehicle body and pivotally connected thereto, whereby it may be used for steering, springs between the trucks and the vehicle body, a hydrocarbon gas engine together with its fuel supply carried by said second truck independent of the vehicle body, and means for controlling the engine supported by said second truck and extending above the bottom of the body into position to be within the reach of a person seated within the vehicle body; substantially as described.

14. The combination of the body of a road engine or self-propelling vehicle, a truck supporting one end of the vehicle body, a second truck supporting the other end of the vehicle body and pivotally connected thereto, whereby it may be used for steering, springs between the trucks and the vehicle body, a hydrocarbon gas engine, together with its fuel supply carried by said second truck independent of the vehicle body, means for detachably connecting the engine with a traction wheel on said second truck, and means for controlling the engine and its connecting means supported by said second truck and extending above the bottom of the body into position to be within the reach of a person seated within the vehicle body; substantially as described.

15. A driving and steering truck for road engines or self-propelling vehicles, comprising an axle, a driving and steering wheel and a motor, motor-controlling devices, of which a part extends to the body of the vehicle within reach of the operator, said motor-controlling devices including flexible connections whereby the motor may yield relatively to the body, in combination with a steering mechanism for turning said axle on a substantially vertical axis, said motor being carried by the driving and steering truck, and springs interposed between the motor and the body of the vehicle; substantially as described.

16. A driving and steering two-wheeled truck for road engines or self-propelling road vehicles, comprising an axle, and driving and steering wheels, and a hydrocarbon gas engine of the compression type, controlling devices therefor extending within reach of the operator on the body of the vehicle, in combination with a steering mechanism including an element supported by said axle; substantially as described.

17. A driving and steering two-wheeled truck for road engines or self-propelling road vehicles, comprising an axle and driving ing and steering wheels, and a hydrocarbon gas engine of the compression type supported by the axle and located between the wheels, controlling devices, and a steering mechanism including an element supported by said axle; substantially as described.

18. The combination with a driving and steering two-wheeled truck for road engines or self-propelling road vehicles, comprising an axle and a driving and steering wheel, and a hydrocarbon gas engine of the compression type, controlling devices and a steering mechanism, an element of which is supported by the axle, of hand-operated devices for actuating the controlling devices from above the body of the vehicle, and flexible connections between such hand-operated devices and the controlling devices, whereby the engine is controlled without interference with or by the relative movements of the truck and body; substantially as described.

19. The combination with a driving and steering two-wheeled truck for road engines or self-propelling road vehicles, comprising an axle and a driving and steering wheel, and a hydrocarbon engine, controlling devices therefor, and a steering mechanism including an element supported by the axle, of hand-operated devices for actuating the engine-controlling devices from above the body of the vehicle, and flexible connections between such hand-operated devices, whereby the engine is controlled without interference with or by the relative movement of the truck and body; substantially as described.

20. A driving and steering two-wheeled truck for road engines or self-propelling road vehicles, comprising an axle, driving and steering wheels, a hydrocarbon gas engine of the compression type, a clutch between said engine and the wheels, and clutch-controlling devices and a steering mechanism, an element of which is supported by the axle; substantially as described.

21. The combination with the body of a road engine or self-propelling vehicle, of a two-wheeled truck supporting one end of the vehicle body and pivotally connected thereto, whereby it may be used for steering, springs between the truck and the vehicle body, a hydrocarbon gas engine of the compression type, together with its fuel supply, carried by said truck independent of the vehicle body, and means for controlling the engine supported by said truck and extending above the bottom of the body into position to be within the reach of a person seated in the vehicle body; substantially as described.

GEO. B. SELDEN.

Witnesses:
JAMES H. COOPER,
H. C. H. COOPER.